Figure 1:
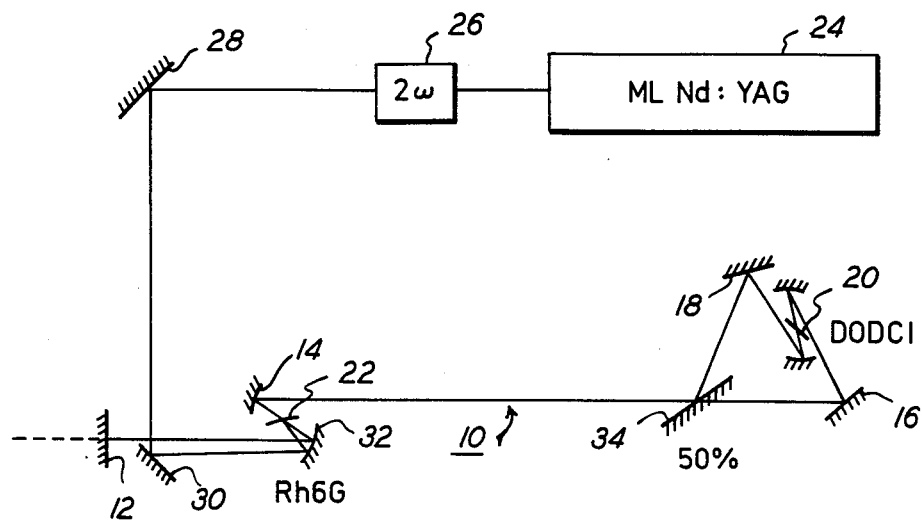

United States Patent [19]

Mourou et al.

[11] Patent Number: 4,617,665
[45] Date of Patent: Oct. 14, 1986

[54] DYE LASER

[75] Inventors: Gerard Mourou, Rochester, N.Y.;
Theodore B. Norris, Huntington, Pa.;
Theodore Sizer, II, Rochester, N.Y.

[73] Assignee: University of Rochester, Rochester, N.Y.

[21] Appl. No.: 618,715

[22] Filed: Jun. 8, 1984

[51] Int. Cl.[4] .............................................. H01S 3/098
[52] U.S. Cl. ....................................... 372/18; 372/20;
372/94; 372/54; 372/108; 372/97
[58] Field of Search ..................................... 372/18–20,
372/22, 26, 28, 92, 94, 54, 108, 97

[56] References Cited

U.S. PATENT DOCUMENTS 4,400,814 8/1983 Fork et al. ............................ 372/26

OTHER PUBLICATIONS

Vanherzeele et al.; "Colliding Pulse Mode Locking of z Nd:YAG Laser with an Antiresonant Ring Structure"; Appl. Opt. v. 20(20) Oct. '81.
Ippen et al.; Passive Mode Locking of the CW Dye Laser", Appl. Phys. Lett. v. 21(8), Oct. '72.
Sizer, II et al., "Synchronous Amplification of Sub-picosecond Pulses" IEEE JQE v.19(4), Apr. '83, p. 506.
Fork et al.; "Femtosecond Optical Pulses"; IEEE JQE 19(4) Apr. '83, p. 500.
Sizer, II et al., "Gen. and Amp. of Sub-Picosecond Pulses Using a Frequency-doub. Nd:YAG Pumping Source"; Opt. Comm. 39(4) 'Oct. 81.

Primary Examiner—Léon Scott, Jr.
Attorney, Agent, or Firm—Martin LuKacher

[57] ABSTRACT

A dye laser system wherein the dye medium is pumped by frequency doubled mode locked laser pulses from a Nd:YAG laser and also mode locked by colliding pulses in an anti-resonant ring having a saturable absorber.

14 Claims, 2 Drawing Figures

DYE LASER

The present invention relates to dye lasers, and particularly to a dye laser system which allows the dye laser to be synchronously pumped by a CW mode-locked laser.

The invention is especially suitable for producing stable ultrashort laser pulses, for example of subpicosecond duration (90 femto-seconds (fs) with jitter in time of occurrence of less than 20 picoseconds).

It is a feture of the invention to provide a colliding pulse mode locked dye laser which is synchronously pumped by a CW mode-locked laser, or from a CW mode-locked laser system which may include a laser amplifier pumped by a CW mode-locked laser oscillator, as described in a patent application, U.S. Ser. No. 593,992, filed Mar. 27, 1984 in the name of Steven Williamson, et.al., and assigned to the same assignee as the present application.

Synchronous pumping of a colliding pulse mode-locked (CPM) dye laser from a mode-locked laser has been precluded because of phase (time) differences between the pump pulses and the pulses in the cavity of the CPM laser. It has been discovered in accordance with the invention that such phase differences can be overcome by the use of an anti-resonant ring in the dye laser cavity. Thus, there is provided a dye laser system which is both synchronously pumped and colliding pulse mode locked, yielding stable ultrashort laser pulses.

Figure 2:
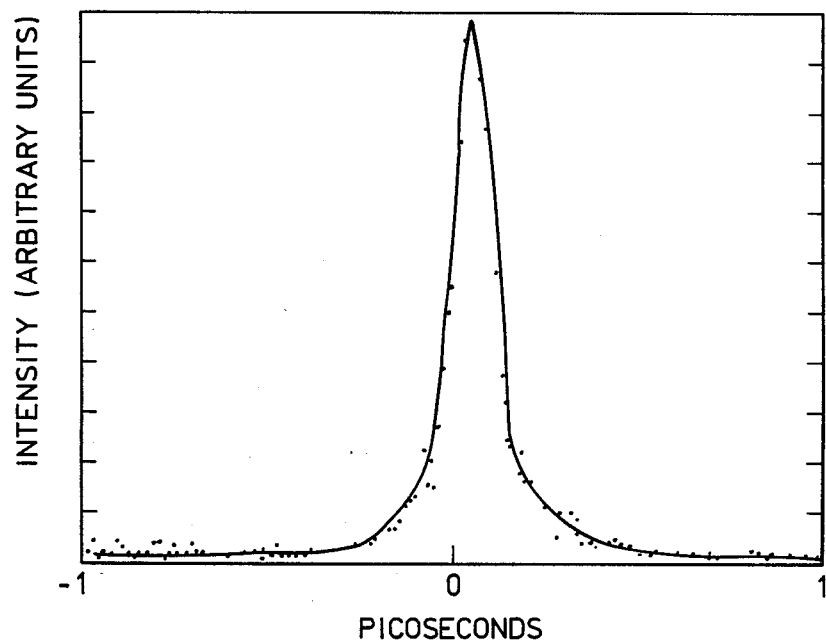

The foregoing and other features, objects and advantages of the invention will become more apparent from a reading of the following description in a connection with the accompanying drawings in which:

FIG. 1 is a schematic diagram of a dye laser system provided in accordance with the invention; and FIG. 2 is a graph showing an output laser pulse provided by the system shown in FIG. 1.

Referring to the drawings, there is shown a dye laser having a linear cavity 10. The cavity has four mirrors 12, 14, 16, and 18. The end mirror 12 is an output coupler (suitably 1%). The other mirrors 14, 16 and 18 define the ends of an anti-resonant ring containing a saturable absorber. Suitably the absorber is a jet 20 (10 um in thickness) of DODCI. Such absorbers are discussed in *Ultrashort Light Pulses,* S. L. Shapiro, Editor, Springer-Verlag, Berlin, Heidelberg, N.Y. 1977, pps. 40-65. Reference may be had to A. E. Seigman, IEEE J. Quant. Electron. QE-9, 247 (1973) for further information concerning the design of an anti-resonant ring.

The dye, suitably a jet 22 of Rhodamine 6G (Rh6G) is pumped by a CW pumped mode locked Nd:YAG laser oscillator 24, the output of which is frequency doubled in a doubler crystal 26. For further information as to CW pumped Nd:YAG mode-locked laser oscillators, reference may be had to T. Sizer, et.al., IEEE J. Quant. Electron., QE-19, 506 (1983); and T. Sizer, et.al., Opt. Commun. 39, 259 (1981).

The dye is synchronously pumped by the pulses from the laser 24 which are frequency doubled (suitably 90 ps pulses of 532 nm light at 100 MH repetition rate). The average power of the pump pulses may be 1.5 W. The pump pulses are directed to the Rh6G dye jet 22 by mirrors 28, 30 and 32. The laser pulses generated the Rh6G in the cavity 10 are split by a 50% splitter 34 and focused in the DODCI jet 20. The pulses recombine at the splitter and interfere so that the anti-resonant ring acts as a 100% reflector. The collisions of the laser pulses occur in the antiresonant ring, in that the pulses split, travel in opposite directions around the ring, and collide in the absorber 20 where a standing wave pattern exists. In the Rh6G medium, however, only one laser pulse exists at any one time. Pulses progagate linearly through the dye gain medium and do not collide. It will be apparent that at any instant there can be only one dye laser pulse in the part of the cavity between the end mirror 12 and the beam splitter 34, while there can be two pulses in the anti-resonant ring part of the cavity. Accordingly, the pumping pulses can reach the dye 22 at the same time as the dye laser pulses, and synchronous pumping occurs.

It will also be seen that the cavity length can be adjusted so that synchronous pumping occurs. This adjustment does not affect the CPM operation in the ring because of the isolation at the combining point (i.e., the beam splitter 34). Therefore, there is provided both synchronous pumping and CPM operation in the dye laser system.

FIG. 2 shows that the system generates output pulses with an autocorrelation width of 130 fs., which for Gaussian shape pulses corresponds to a pulse width of 90 fs. With Rh6G the wavelength of the output pulses is 615 nm. In actual tests, the output power was 60 mW, and the spectral width approximately 60 Angstroms. The output pulse stability has the stability of the pump laser 24 (about 1% rms). Tuning may be provided for with a 2 um uncoated pellicle (not shown) in the cavity 10.

We claim:

1. A CPM dye laser system which generates laser pulses and having a laser cavity, comprising: an anti-resonant ring in said cavity defining a 100% reflector at one end of said laser cavity, and means including a CW pumped mode-locked laser for pumping a laser dye gain medium with pump pulses synchronous with the laser pulses generated in said cavity, the length of said cavity defined between said ring and another reflector at the end of said cavity opposite to said one end said length being adjustable so that synchronous pumping occurs.

2. The laser system according to claim 1 wherein a beam splitter is disposed between end mirrors of said cavity, and said beam splitter defines part of said ring.

3. The laser system according to claim 1 wherein said anti-resonant ring has an absorber medium therein, and wherein said pulses generated in said dye laser gain medium collide in said absorber medium to provide CPM operation in said cavity.

4. The laser according to claim 3 wherein said pumping means includes means for changing the frequency of the pump pulses from said CW mode-locked laser.

5. The laser system according to claim 3 wherein said ring includes a beam splitter at which said dye laser pulses split to travel in opposite directions around said ring to collide in said absorber medium.

6. The laser system according to claim 5 wherein said absorber medium in said ring includes an absorber dye material.

7. The laser according to claim 6 wherein said CW mode-locked laser has an Nd:YAG gain medium, said dye is Rh6G, and said absorber dye is DODCI.

8. The system according to claim 1 wherein said ring includes a saturable absorber medium.

9. The system according to claim 1 wherein said ring is defined by a beam splitter through which laser pulses enter and leave and in which said laser pulses combine after CPM operation in said ring.

10. The system according to claim 9 wherein said cavity is defined by at least 4 mirrors, at least 2 in said ring, and one being an end mirror.

11. The system according to claim 9 wherein said dye laser includes a dye medium, said pumping means including means for directing said pump pulses from said mode-locked laser onto said dye medium.

12. The system according to claim 11 wherein said ring includes a saturable absorber medium.

13. The system according to claim 12 wherein said CW mode-locked laser has an Nd:YAG gain medium, said pumping means includes means for doubling the frequency of the pump pulses from said Nd:YAG CW mode-locked laser, said dye medium is Rh6G, and said absorber is DODCI.

14. The system according to claim 12 wherein said absorber and dye are in the form of jets.

* * * * *